June 18, 1968     W. R. EDWARDS     3,388,729
APPARATUS FOR PRODUCING DECORATIVE WOODEN COLUMN SHAFTS
Filed Feb. 21, 1966     5 Sheets-Sheet 4
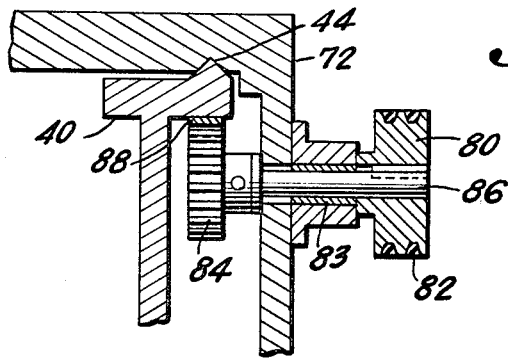
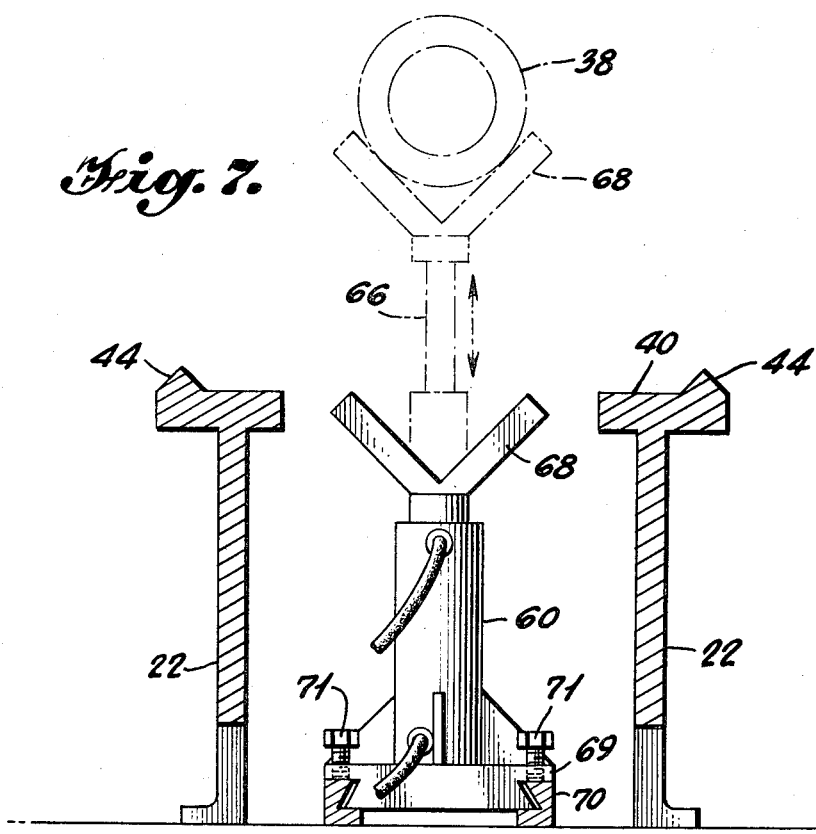
INVENTOR
WALTER R. EDWARDS
BY
Irons, Birch, Swindler & McKie
ATTORNEYS

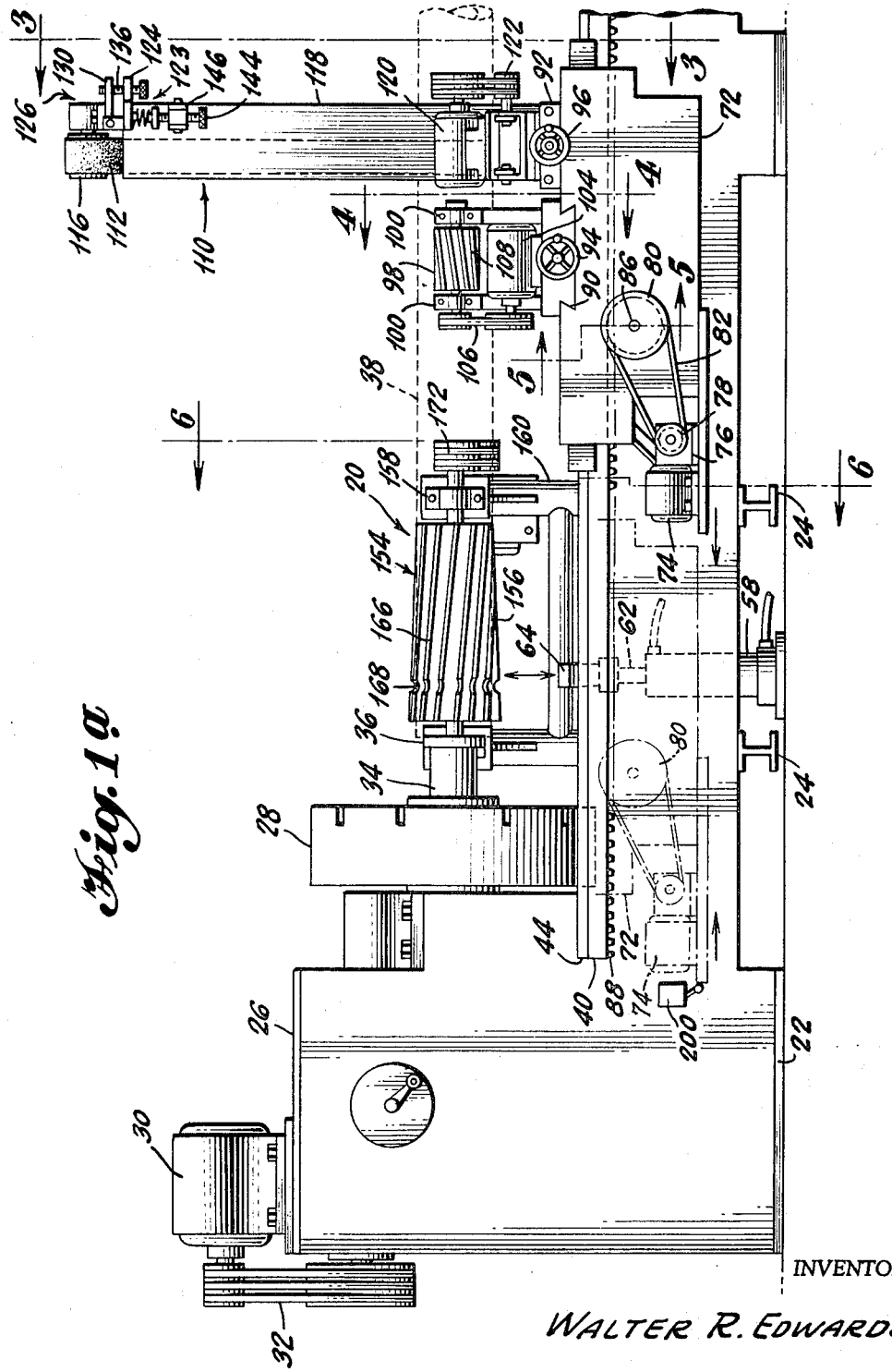

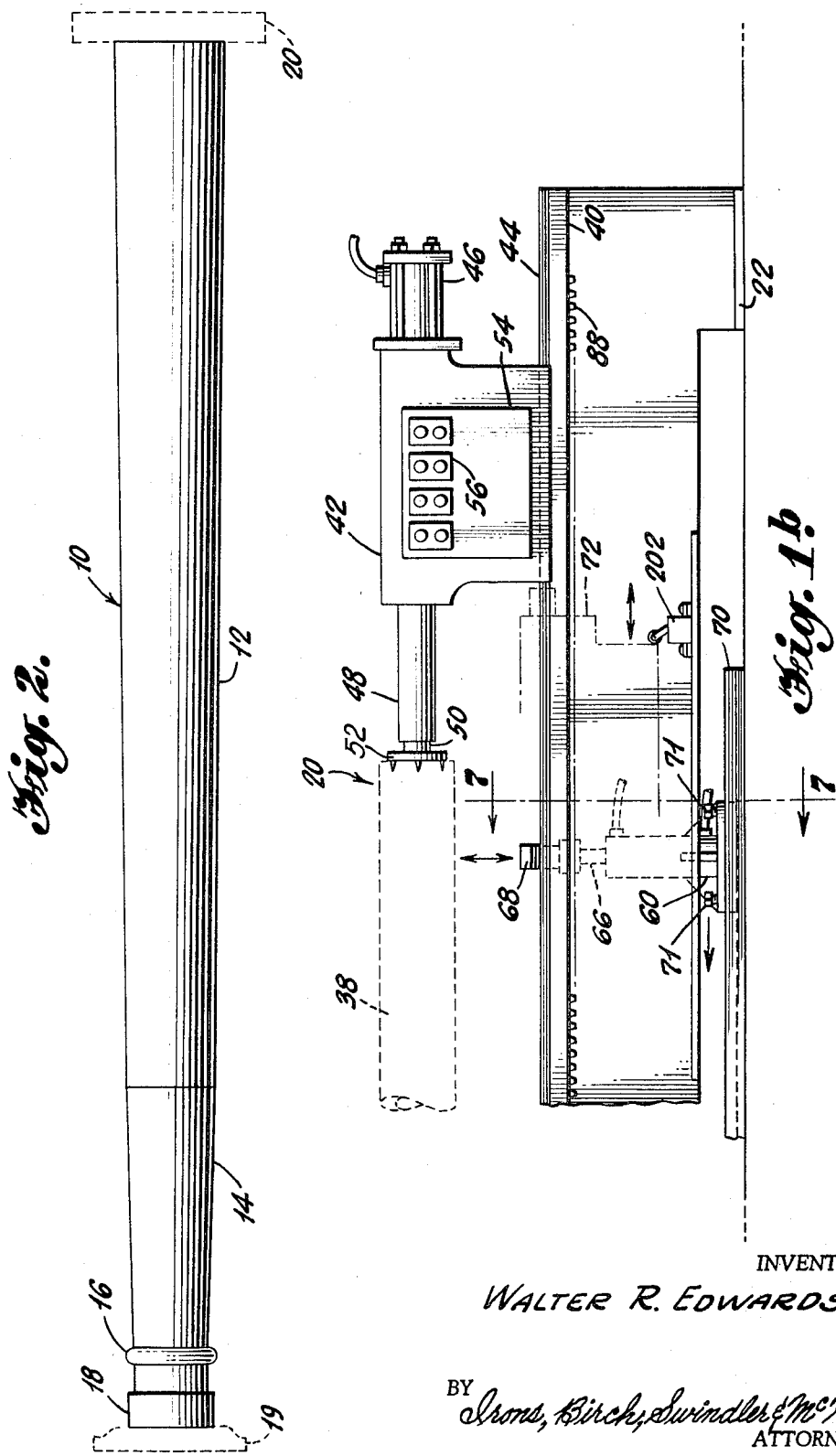

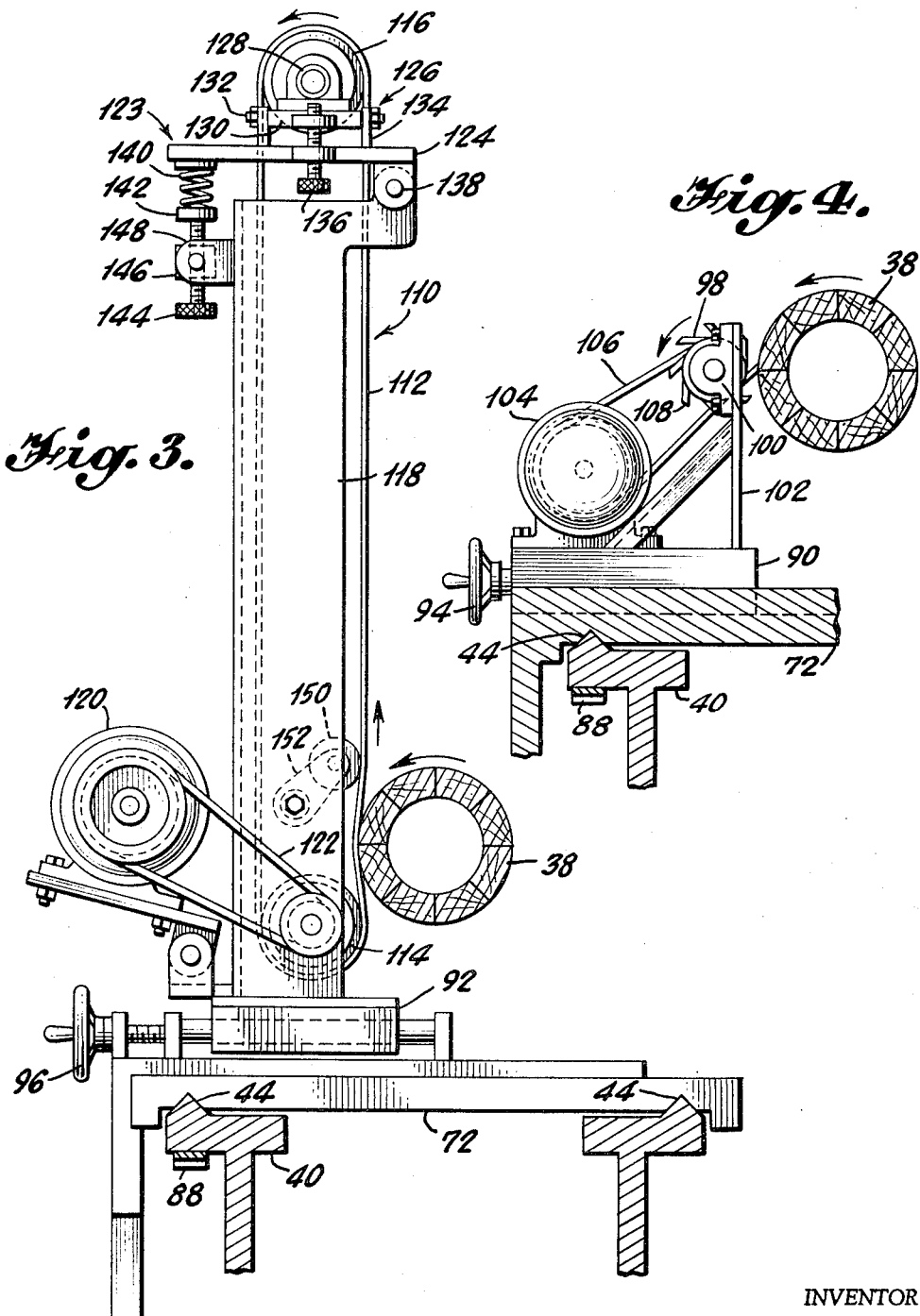

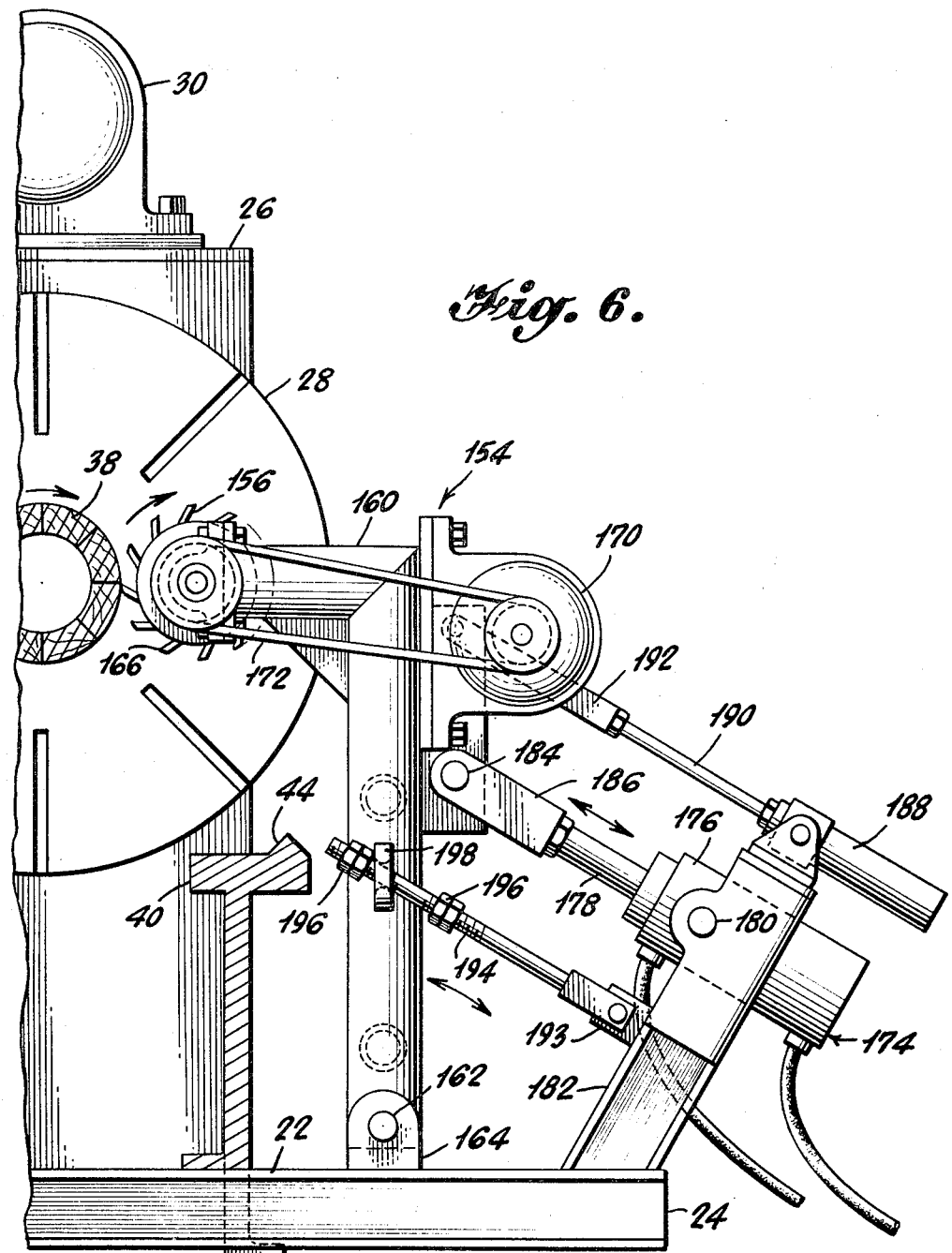

United States Patent Office 3,388,729
Patented June 18, 1968

3,388,729
APPARATUS FOR PRODUCING DECORATIVE
WOODEN COLUMN SHAFTS
Walter R. Edwards, 919 Murphree St.,
Troy, Ala. 36081
Continuation-in-part of abandoned application Ser. No. 523,346, Jan. 27, 1966. This application Feb. 21, 1966, Ser. No. 528,724
8 Claims. (Cl. 144—47)

This invention relates to a method and an apparatus for producing decorative wooden column shafts, which are used for example, in the construction of homes embodying a Colonial style of architecture, and is a continuation-in-part of my prior application Ser No. 523,346, filed Jan. 27, 1966, now abandoned. Specifically, the invention concerns a lathe which is particularly adapted for the shaping and finishing of large wooden column shafts having a decorative appearance and a method for producing such column shafts which may be accomplished with the aforesaid lathe.

Decorative wooden columns are used extensively in the construction of private homes and other buildings, frequently for supporting an entrance way or porch roof structure. The columns usually frame the entranceway of the building in such a manner as to product a pleasing effect to the eye by complementing the overall architectural building scheme.

The production of column shafts used in decorative wooden columns has continually presented a problem due to the required physical characteristics of such shafts. The columns are often of a rather large size, the column shafts commonly being twenty feet or more in length. Furthermore, the exterior surface of the column shafts must be smoothly finished, and in most building structure designs it is also desirable to incorporate a decorative design on the neck portion of the shaft near the top thereof adjacent the column capital.

Due to the large size and finishing requirements of decorative column shafts, the production of such shafts has heretofore been accomplished by utilizing methods which are largely inefficient. According to one such method the exterior of the column shaft is first shaped in a lathe to a circular cross-sectional configuration. The column may also be tapered in the lathe, if desired. The surface of the column shaft must then be smoothly finished which is usually done by hand-sanding the shaft while it is in the lathe. After the shaft has been shaped and the surface thereof finished, it must removed from the lathe for the application of any decorative design. The decorative design is most often separately formed by hand and thereafter affixed to the neck portion of the shaft near the top thereof with an adhesive such as wood glue. It will be seen from this description that the previous methods for producing decorative wooden column shafts are extremely inefficient and therefore unduly expensive.

The present invention overcomes these problems of inefficient production by providing an apparatus and a method for simultaneously accomplishing all of the steps required for the shaping and finishing of a decorative column shaft. The apparatus of the invention is a lathe which is specifically adapted for the turning of a column shaft workpiece. The lathe includes a carriage assembly on which are mounted a rotary cutter and a belt sander for respectively shaping the workpiece to the desired column shaft configuration, which conveniently may be a circular tapered configuration, and finishing the surface of the shaft. The lathe also includes a rotatable cutter assembly which forms a decorative design on the neck portion of the shaft, simultaneously with the other shaping and finishing functions. By performing all of the shaping and finishing functions simultaneously in a single apparatus, the inefficiencies of the former column shaft production methods are eliminated.

The method of the present invention, which may be accomplished with the aforementioned lathe of the invention, contemplates the simultaneous engagement of the surface of a turning workpiece with a plurality of cutters and a sander for shaping the workpiece to the desired column shaft configuration, and finishing the surface thereof.

With the foregoing in mind, it is a primary object of the present invention to provide an apparatus for the shaping and finishing of large wooden column shafts.

Is is another object of the invention to provide a lathe which is particularly adapted for producing decorative wooden column shafts in which all of the shaping and finishing functions are accomplished by said lathe simultaneously.

It is a further object of the invention to provide a lathe having a rotatable cutter assembly, a rotary cutting head and a belt sander for simultaneously shaping and finishing a workpiece to a desired decorative column shaft configuration.

It is also an object of the present invention to provide a method for shaping decorative wooden column shafts which method is particularly efficient and produces a finished column shaft that is immediately available for use in the construction of a building.

The above and more specific objects of the present invention will be appreciated by reference to the specific description of a preferred embodiment of the apparatus of the invention given hereinafter, which apparatus may be used for practicing the method of the invention. It is to be understood that the illustrated and described embodiment is not to be considered as limiting the scope of the invention, but rather only as illustrative of a structure incorporating the principles of the invention. The preferred apparatus of the invention will best be understood by reference to the following drawings in which:

FIG. 1a is a vertical side elevational view of a portion of a lathe incorporating the principles of the present invention;

FIG. 1b is a vertical side elevational view of the remaining portion of the lathe shown in FIG. 1a;

FIG. 2 is an elevational view of a column shaft produced by the method of the invention which may be accomplished utilizing the lathe shown in FIGS. 1a and 1b;

FIG. 3 is a sectional view taken on line 3—3 of FIG. 1a;

FIG. 4 is a sectional view taken on line 4—4 of FIG. 1a;

FIG. 5 is a sectional view taken on line 5—5 of FIG. 1a;

FIG. 6 is a sectional view taken on line 6—6 of FIG. 1a; and

FIG. 7 is a sectional view taken on line 7—7 of FIG. 1b.

Referring first to FIG. 2, there is shown therein a decorative wooden column shaft 10 such as is used in the construction of buildings embodying a Colonial style of architecture. The shaft has a lower tapered portion 12 of circular cross section, and an upper neck portion 14 also of a tapered circular cross-sectional configuration. As seen in the drawing, the taper of neck portion 14 may be more severe than that of lower shaft portion 12. Neck portion 14 also includes a decorative mold 16 which may be of a semicircular cross section, as shown in FIG. 2. The portion 18 of shaft 10 may be left untapered, as shown in the drawing, to add to the overall decorative appearance of the shaft. When shaft 10 is permanently positioned during the construction of a building, a column capital 19 would normally be affixed to the upper end of shaft portion 18 and a column base 20 affixed to the lower end of shaft portion 12, capital 19 and base 20 being shown in phantom lines in FIG. 2.

As will be seen from this description of a conventional decorative wooden column shaft, portions of the surface thereof are normally of different configurations and in addition, the entire surface must be smoothly finished to present a suitable appearance. Moreover, the large size of such column shafts, commonly 20 feet or more in length, presents unique problems in the production thereof. Conventional wood turning lathes are inadequate, both in size and operating capability, for producing the shaft. As a result of the inadequacies of the heretofore known equipment, the previous methods for producing decorative column shafts are largely inefficient requiring many of the shaping and finishing functions to be performed by hand. Obviously such inefficient methods significantly contribute to the cost of column shafts so produced.

The lathe of the present invention overcomes the inefficiencies of former column shaft production methods by incorporating means therein for performing all of the column shaft shaping and finishing functions simultaneously. Lathe 20, shown in FIGS. 1a and 1b, is representative of an apparatus incorporating such means, and is particularly adapted for carrying out the column shaft shaping and finishing method of the invention. Lathe 20 includes a base 22 comprising a suitable metal framework 24 for supporting the lathe components. A headstock assembly 26 is mounted on one end of base 22 and includes therein a conventional lathe transmission having drive train elements (not shown) for rotatably driving a chuck unit 28. Torque producing power means, such as an electric motor 30, is drivingly connected to the transmission within headstock assembly 26, as by the belt and pulley drive arrangement 32.

Lathe chuck unit 28 is drivingly connected to a workpiece-engaging member 34 which includes an interchangeable adapter 36 for accommodating workpieces of various diameters. One end of a workpiece 38, shown in phantom lines in FIGS. 1a and 1b, is securely held by workpiece-engaging member 34 for rotation about a workpiece turning axis which passes through the center of rotation of member 34.

Also mounted on base 22 is a lathe bed 40 which extends longitudinally from headstock assembly 26 along the entire length of base 22. Bed 40 is normally in excess of 20 feet in length so that lathe 20 can conveniently accommodate large column shaft workpieces. A tailstock assembly 42 is mounted on bed 40 opposite headstock assembly 26 and is movable longitudinally along the bed. As best seen in FIG. 3, bed 40 includes a pair of parallel rails 44 which guidingly support tailstock assembly 42. Suitable means (not shown) connect tailstock assembly 42 to bed 40 so that the tailstock assembly may be longitudinally positioned along bed 40 in the desired position and locked into place. Tailstock assembly 42 may thus be appropriately positioned longitudinally for receiving workpieces of varying lengths.

The upper portion of tailstock assembly 42 may also be adjusted transversely of the longitudinal axis of bed 40 by conventional means (not shown) so that workpiece 38 may be tapered, as will be described hereinafter.

The upper portion of tailstock assembly 42 includes power-operated workpiece-clamping means 46 which, as shown in the drawings, may be a fluid piston and cylinder mechanism. The details of power-operated workpiece-clamping means for lathes are well known, one such means being shown in Steiner Patent 1,689,410, and a further description thereof is believed unnecessary for an understanding of the present invention. Clamping means 46 includes an extendible piston rod 48, having journalled in the end thereof a workpiece-engaging member 50. Workpiece-engaging member 50 includes an interchangeable adapter 52 similar to adapter 36 of workpiece-engaging member 34.

Workpiece-engaging member 50 is aligned with workpiece-engaging member 34 and is positioned in opposing relationship thereto above bed 40. The workpiece turning axis which passes through the center of rotation of member 34, also passes through the center of rotation of member 50, the turning axis thus being vertically spaced above bed 40. Workpiece 38 is securely clamped between workpiece-engaging members 34 and 50 for rotation about the turning axis by the extension of piston rod 48 upon actuation of clamping means 46.

A control panel 54 is also mounted on tailstock assembly 42 and includes thereon a plurality of switching mechanisms 56 for controlling the operation of motor 30, clamping means 46 and other power-operated units of the lathe, to be described in detail hereinafter.

Means are provided for centering a workpiece between workpiece-engaging members 34 and 50 to be clamped therebetween for rotation about the turning axis. The centering means includes two fluid cylinder and piston mechanisms 58 and 60. Mechanisms 58 and 60 are supported on base 22 below the central longitudinal axis of bed 40 between parallel rails 44.

Mechanism 58 includes an extendible piston rod 62 having a workpiece support 64 affixed thereto. Similarly, mechanism 60 includes an extendible piston rod 66 having a workpiece support 68 affixed thereto. Supports 64 and 68 may be V-shaped or semicircular as desired for engageably receiving a workpiece thereon.

Mechanism 58 is positioned adjacent headstock assembly 26 and mechanism 60 is positioned adjacent tailstock assembly 42 for supporting therebetween, by means of workpiece supports 64 and 68, respectively, a column shaft workpiece to be positioned between workpiece-engaging members 34 and 50. Upon manipulation of the appropriate switching mechanism 56, a workpiece held by supports 64 and 68 is lifted by mechanisms 58 and 60 to a position centered between workpiece-engaging members 34 and 50. After the workpiece has been clamped between members 34 and 50 by clamping means 46, supports 64 and 68 as lowered so as not to interfere with the turning of the workpiece.

Mechanism 60 includes a base 69 which may be moved longitudinally along base 22 in a track 70, in correspondence with the longitudinal movement of tailstock assembly 42, and secured in the desired position by locking bolts 71, to thus accommodate workpieces of varying lengths. In addition, track 70 is wide enough to permit slight transverse adjustments of mechanism 60 with respect to the longitudinal axis of bed 40 so that workpiece 38 may be centered between engaging members 34 and 50 in the proper position to be tapered, as will be hereinafter described.

A carriage assembly 72 is mounted on bed 40 for movement therealong parallel to the longitudinal axis of the bed, and is guidingly supported by bed rails 44. Carriage assembly 72 includes an electric drive motor 74 coupled to a speed reduced 76 having an output drive pulley 78 rotatably supported thereby. Pulley 78 is connected to a pinion driving pulley 80 by belts 82. Pulley 80 is affixed to one end of a shaft 86 which is journalled for rotation in carriage assembly 72 by a suitable bearing 83. A pinion gear 84 is secured to the other end of shaft 86, the teeth of pinion gear 84 being engaged with the teeth of a rack gear 88 affixed to the underside of bed 40. As seen in the drawings, rack gear 88 extends the entire length of bed 40 and is parallel to the longitudinal axis thereof. Upon energization of motor 74, pinion gear 84 is rotated by shaft 86 and is thus caused to drivingly engage rack gear 88 which results in the movement of carriage assembly 72 longitudinally along bed 40. Initial energization of motor 74 is controlled by one of the switching mechanisms 56 on control panel 54. In addition, other means are provided on lathe 20 for automatically controlling the operation of motor 74, as will be subsequently described.

Mounted on carriage assembly 72 are two cross-feed mechanisms 90 and 92. Cross-feed mechanisms 90 and 92 are each movably supported on carriage assembly 72 for transverse movement with respect to the turning axis of workpiece 38. Conventional means (not shown) are provided for cross-feed mechanisms 90 and 92 for adjusting the transverse positions thereof with respect to the turning axis of workpiece 38, the adjusting means including manually rotatable handles 94 and 96, respectively.

A rotary cutter head 98 is mounted on cross-feed mechanism 90. Cutter head 98 is journalled for rotation in suitable bearings 100 which are supported by a framework 102 affixed to the top of cross-feed mechanism 90. Cutter head 98 is rotatably driven by an electric motor 104 by means of a V-belt and pulley arrangement 106. As best shown in FIG. 4, cutter head 98 includes a plurality of knives 108 which engage turning workpiece 38 for shaping that portion of the workpiece which corresponds to tapered, circular cross-sectioned portion 12 of column shaft 10.

A belt sander 110 is mounted on cross-feed mechanism 92. Belt sander 110 includes a belt 112 having a suitable abrasive coating on the outer surface thereof, the belt being supported by belt rollers 114 and 116. Belt rollers 114 and 116 are rotatably supported at the lower and upper end, respectively, of a frame 118. An electric motor 120 is drivingly connected to belt roller 114 by a suitable pulley and V-belt arrangement 122.

Belt roller 116 is connected to the upper end of frame 118 by a biassing unit 123 which urges roller 116 upwardly and thus ensures that belt 112 will be held tautly about rollers 114 and 116. Biasing unit 123 includes a platform 124 on which is mounted a bearing support 126. Roller 116 is journalled for rotation in support 126 by a suitable bearing 128.

Support 126 includes a plate 130, one end of which is affixed to a rotatable shaft 132. Shaft 132 is carried in upstanding legs 134 which in turn are fixedly secured to platform 124. An adjustment bolt 136 is connected between platform 124 and plate 130 to permit angular adjustment of the rotational axis of roller 116 about the axis of shaft 132. Distribution of the contact pressure between belt 112 and roller 116 may thus be regulated so that the pressure will be uniformly distributed across the width of the belt.

Platform 124 is connected to frame 118 by pivotal connection 138 which permits roller 116 to be raised and lowered with respect to frame 118. A compression spring 140 is held between the bottom of platform 124 and a circular flange 142 affixed to the upper end of a regulating bolt 144. Bolt 144 threadingly engages a nut 146 which is pivotally supported by ears 148 attached to frame 118; nut 146 is thus maintained in a vertically stationary position with respect to frame 118 by ears 148. By adjusting the position of bolt 144 with respect to nut 146 the force exerted on the underside of platform 124 may be regulated to thus control the biasing force exerted on platform 124 by spring 140 which urges roller 116 upwardly.

A contact roller 150 is connected to frame 118 by a pair of roller supports 152 which are bolted to frame 118. Contact roller 150 engages the moving surface of belt 112 slightly above roller 114 to ensure that belt 112 will assume a flat or planar configuration as it passes the rotating surface of workpiece 38.

As best seen in FIG. 3, the turning axis of workpiece 38 is vertically positioned intermediate rollers 114 and 150. Thus, when cross-feed mechanism 92 is adjusted to place belt 112 into engagement with the surface of rotating workpiece 38, the workpiece contacts belt 112 at the flat surface thereof between rollers 114 and 150.

The tapered, circular cross-sectioned portion 12 of column shaft 10 is shaped and finished by cutter head 98 and belt sander 110 as carriage assembly 72 moves along bed 40. Since carriage assembly 72 moves along bed 40 parallel to the longitudinal axis of the bed, in order to taper workpiece 38, it is necessary to angularly offset the workpiece turning axis at tailstock assembly 42 one-half the distance of the desired taper, as is well known in the art. Thus, if the center of workpiece 38 is offset at tailstock assembly 42 from a parallel relationship with the longitudinal axis of bed 40 one inch, for example, the taper cut by cutter head 98 will be two inches. In order to position workpiece 38 between workpiece-engaging members 34 and 50 with the appropriate amount of workpiece turning axis angular offset, mechanism 60 is transversely adjusted in track 70 so that the desired offset will be effected when workpiece 38 is centered by mechanisms 58 and 60 between members 34 and 50 for clamping therebetween by clamping means 46.

A separate rotatable cutter assembly 154 is provided for shaping column shaft neck portion 14. Cutter assembly 154 includes a cutter 156 journalled for rotation in bearings 158 to an inverted L-shaped frame 160. Frame 160 is pivotally connected at the lower end thereof to base 22 by a shaft 162 which is rotatably held in lugs 164 affixed to metal framework 24 of the base. The axis of rotation of shaft 162 is substantially parallel with the longitudinal axis of bed 40. The upper portion of frame 160, which carries cutter 156, extends vertically above and then horizontally over bed 40. Pivotal movement of frame 160 about the axis of shaft 162 thus moves frame 160 and cutter 156 transversely with respect to the surface of workpiece 38.

Cutter 156 comprises a plurality of shaped knives 166. As best seen in FIG. 1a, knives 166 each have a semicircularly recessed portion 168 therein. In addition, the periphery of cutter 156 is uniformly tapered along the length thereof, the maximum cutter diameter being adjacent workpiece-engaging member 34.

An electric motor 170 is drivingly connected to cutter 156 by a V-belt and pulley arrangement 172 for rotating the cutter in bearings 158 about an axis substantially parallel with the longitudinal axis of bed 40. It will be seen from this description that as frame 160 pivots inwardly about the axis of shaft 162, cutter 156 will be placed into engagement with the surface of rotating workpiece 38. As cutter 156 feeds into workpiece 38, knives 166 will shape that portion of workkpiece 38 corresponding to column shaft neck portion 14, including neck mold 16 which is shaped by knife recesses 168.

Power operated positioning means are provided for pivoting frame 160 about the axis of shaft 162. The positioning means comprises a fluid cylinder and piston unit 174. Unit 174 includes a cylinder 176 having a piston therein to which is integrally attached a piston rod 178 that extends from one end of cylinder 176. Cylinder 176 is pivotally secured to base 22 by stub shafts 180 journalled in framework extensions 182. Piston rod 178 is pivotally connected to frame 160 by a shaft 184 to which is affixed U-shaped connector 186, connector 186 being adjustably attached to piston rod 178. Reciprocation of piston rod 178, incident to the movement of the piston within cylinder 176, pivots frame 160 and cutter 156 supported thereon about the axis of shaft 162, to thus move cutter 156 toward or away from the surface of turning workpiece 38 as desired.

Means are also provided for regulating the rate of pivotal movement of frame 160. The regulating means comprises a conventional fluid damper 188 having an elongated piston rod 190 connected to frame 160 by connector 192. Damper 188 is a conventional hydraulic piston and cylinder mechanism which is pivotally connected to framework extension 182 above cylinder 176. Damper 188 includes a manual adjustment for regulating the flow of fluid within the device, which thus controls the resistance or movement inhibiting effectiveness of the damper. It will be seen that the rate at which unit 174 pivotally moves frame 160 about the axis of shaft 162 is directly effected by the action of damper 188. By appropriate adjustment of damper 188, the rate at which cutter 156 moves into workpiece 38 may be controlled to preclude splintering of the workpiece which might occur if cutter 156 were moved too rapidly into the workpiece. The rate of transverse movement of cutter 156 may thus be adjusted to minimize any possibility of splintering for workpieces 38 of various wood types and grain structures.

Another important feature inherently resulting from the action of damper 188 is that due to controlled movement of cutter 156, neck portion 14 of shaft 10 will not only be shaped, but also finished by a single tool, cutter 156. This result is possible because, under the action of damper 188, the rate of movement of cutter 156 continually decreases as the cutter reaches the inward limit of its transverse movement. As a consequence of this action, progressively less material will be removed from the surface of workpiece 38 by knives 166 as cutter 156 moves inwardly. When the cutter reaches the inward limits of its transverse movement, knives 166 will be removing very little, if any, material from workpiece 38, and will be in effect, finishing the surface thereof. In this manner cutter 156 not only shapes neck portion 14, including decorative mold 16, but also finishes the surface thereof, and thus obviates the necessity of an additional finishing operation for that portion of workpiece 38 corresponding to the shaft neck portion.

Limiting means are also connected between frame 160 and framework extension 182 for defining the movement limits of the frame and attached cutter 156. The limiting means comprises a threaded rod 194 having two pairs of adjustable nuts 196 thereon. One end of rod 194 is pivotally secured to framework extension 182 by a connector 193, the other end of rod 194 being received through a hole in lug 198 which is affixed to frame 160. One pair of nuts 196 is positioned on each side of lug 198 to define therebetween the travel limits of frame 160. The pairs of nuts 196 may be moved on rod 194 as desired, for limiting the movement of frame 160 and cutter 156 as is appropriate for the shaping and finishing of a particularly configured shaft neck portion 14.

The operation of lathe 20 will be apparent from the description thereof set forth above. Initially, a workpiece 38 is placed in supports 64 and 68 of the workpiece centering means by a suitable lifting device such as a fork lift or travelling crane. The operator of lathe 20, standing adjacent tailstock assembly 42, then manipulates the appropriate switching mechanism 56 for operating mechanisms 58 and 60 to lift and center the workpiece between workpiece-engaging members 34 and 50. Prior to this time, tailstock assembly 42 and mechanism 60 will have been appropriately positioned longitudinally for accommodating the selected workpiece length, and locked into place. In addition, the upper portion of tailstock assembly 42 and mechanism 60 will have been transversely adjusted so that the center of the workpiece will be offset at tailstock assembly 42 from a parallel relationship with the longitudinal axis of bed 40 one-half the distance of the taper to be cut into workpiece 38 for shaping column shaft portion 12.

When the workpiece is centered between workpiece-engaging members 34 and 50, the operator, by appropriate manipulation of another switching mechanism 56 actuates clamping means 46 which securely clamps workpiece 38 between members 34 and 50. Supports 64 and 68 are then lowered back toward bed 40 so as not to interfere with the succeeding operations.

Lathe motor 30 is then energized to commence the rotation of workpiece 38. Thereafter, the operator energizes motors 104 and 120 by manipulation of the appropriate switching mechanisms 56, to start cutter head 98 and belt sander 110 operating.

At this time carriage assembly 72 will be positioned adjacent tailstock assembly 42 and the operator will manually adjust cross-feed mechanisms 90 and 92 by means of rotatable handles 94 and 96, respectively, to move cutter head 98 and belt 112 of belt sander 110 into the proper position for shaping and finishing that portion of the workpiece corresponding to column shaft portion 12.

Carriage assembly drive motor 74 is then actuated and carriage assembly 72 begins moving along bed 40 toward headstock assembly 26. As carriage assembly 72 moves along the bed, rotating cutter head 98 and moving belt 112 shape and finish the surface of the rotating workpiece to the desired configuration.

As soon as carriage assembly 72 begins moving along bed 40, the operator initiates the operation of cutter assembly 154 by energizing motor 170 which drivingly rotates cutter 156. He then activates the positioning means, unit 174, by manipulating the appropriate switching mechanism 56 which causes rotating cutter 156 to move toward and engage the surface of rotating workpiece 38 for shaping that portion of the workpiece corresponding to column shaft neck portion 14, including neck mold 16. When nuts 196 of the movement limiting means abut lug 198, a pressure release mechanism actuated by operation of the appropriate switching mechanism 56, will release the fluid pressure applied to unit 174 permitting frame 160 and cutter 156 to back slightly away from the surface of workpiece 38.

Simultaneously with the shaping and finishing of neck portion 14, carriage assembly 72 shapes and finishes shaft portion 12 while moving along bed 40 towards headstock assembly 26. Carriage assembly drive motor 74 moves the carriage assembly, including cutter head 98 and belt sander 110 mounted thereon, past the portion of workpiece 38 being shaped and finished by cutter 156. Cutter head 98 and belt 112 do not engage this portion of the workpiece due to the fact that the taper cut into workpiece 38 by cutter 156 is more severe than the taper cut by cutter head 98. Therefore, a small amount of transverse spacing will be present between the periphery of the portion of workpiece 38 which corresponds to shaft neck portion 14, and the moving peripheries of cutter head 98 and belt 112.

When carirage assembly 72 reaches a position adjacent headstock assembly 26, the lower edge of the carriage assembly will engage and operate a reversing switch 200 mounted on base 22. Actuation of reversing switch 200 causes the direction of rotation of carriage assembly drive motor 74 to be reversed. Upon reversal of drive motor 74, carriage assembly 72 will start moving back down bed 40 toward tailstock assembly 42.

Just as carriage assembly 72 reverses its direction of movement, the operator moves cutter head 98 transversely outwardly away from the surface of workpiece 38 by rotating handle 94. Thus, when carriage assembly 72 again reaches the portion of workpiece 38 corresponding to column shaft portion 12, belt 112 will again engage and further finish that portion of the shaft as carriage assembly 72 returns to its position adjacent tailstock assembly 42. When carriage assembly 72 has moved along bed 40 from headstock assembly 26 to tailstock assembly 42, the lower edge of the carriage assembly will engage and operate a limit switch 202 also mounted on base 22, which stops carriage assembly drive motor 74. Carriage assembly 72 then stops adjacent tailstock assembly 42 in position for shaping and finishing the next workpiece.

Together, reversing switch 200 and limit switch 202 comprise a carriage assembly travel control means for automatically controlling the movement of carriage assembly 72 along bed 40. Limit switch 202 may be moved along base 22 parallel to the longitudinal axis of bed 40 and appropriately positioned in correspondence with the longitudinal position of tailstock assembly 42, so that the movement of carriage assembly 72 may be appropriately regulated for accommodating workpieces of various lengths.

The operator, by manipulating switching mechanisms 56, then shuts off motors 30, 104, 120 and 170, and energizes piston and cylinder unit 174 to pivot frame 160 outwardly so that cutter 156 will be in position for shaping and finishing the column shaft neck portion of the following workpiece. At this time the finished column shaft may be removed directly from between workpiece-engaging members 34 and 50 by supporting the shaft with an external lifting means and then releasing clamping means 46. Alternatively, supports 64 and 68 may be raised to receive the finished shaft and support the shaft while clamping means 46 is released. The shaft may then be removed by the external lifting means from supports 64 and 68.

The method of the invention will be apparent from the foregoing description of lathe 20 including the operation thereof. The production of decorative column shafts incident to utilization of lathe 20 results in the shaping and finishing of the shaft by an extremely efficient and economical method. The method of the invention thus contemplates the simultaneous shaping and finishing of two distinct portions of a column shaft workpiece having different configurations. The configuration of one such portion may include a decorative mold formed simultaneously with the other column shaft shaping and finishing functions. It will be evident that this method significantly reduces the amount of time and effort required to produce a column shaft, including a decorative mold on the neck portion thereof, that is suitable for immediate installation in a building structure.

The method of the invention can obviously be accomplished with an apparatus other than lathe 20, which, as described above, is adapted for the shaping and finishing of particularly configured column shaft 10. The simultaneous shaping and finishing functions envisioned by the method of the present invention cooperate to produce a unique and unexpected result, specifically, the production of a decorative wooden column shaft by a substantially unitary operation.

The scope of the method contemplated herein should not be limited by the particular apparatus described above for accomplishing such method. It is apparent that variations in the construction of lathe 20 might be made for accomplishing the same result. For example, the shape of knife recesses 168 might be changed if neck molds of other than a semicircular configuration were desired. Therefore, it is to be understood that the scope of the invention is not to be limited by the apparatus hereinbefore specifically described, but that various changes and modifications may be made without departing from the spirit and scope of the invention as defined in the appended claims.

I claim:

1. A lathe for shaping and finishing wooden column shafts comprising:
    a base;
    means mounted on the base for rotatably supporting a workpiece;
    means operatively coupled to said workpiece supporting means for rotating the workpiece;
    a cutter assembly movably connected to the base and including a cutter and means for selectively moving said cutter assembly with respect to the base for periodically placing said cutter into engagement with the workpiece;
    a movable carriage assembly operably connected to the base and including a plurality of independently movable cross-feed mechanisms and means for moving said carriage assembly with respect to the base;
    a cutter head mounted on one of said plurality of cross-feed mechanisms, whereby said one cross-feed mechanism may be selectively positioned to place the cutter head into engagement with the workpiece;
    a sander mounted on another one of said plurality of cross-feed mechanisms, whereby said other cross-feed mechanism may be selectively positioned to place the sander into engagement with the workpiece; and
    means for controlling the simultaneous operation of the workpiece rotating means, the cutter assembly, the cutter head and the sander, whereby the workpiece is shaped and finished to the desired column shaft configuration by the simultaneous operation of the cutter assembly, the cutter head and the sander upon manipulation of said control means.

2. A lathe as recited in claim 1 wherein said cutter is rotatably mounted in the cutter assembly and said cutter assembly further includes means for rotating said cutter.

3. A lathe as recited in claim 2 wherein said cutter head is rotatably mounted on said one cross-feed mechanism and means for rotating said cutter head is also mounted on said one cross-feed mechanism.

4. A lathe as recited in claim 1 wherein said means for selectively moving the cutter assembly comprises;
    positioning means connected between the cutter assembly and the base for selectively moving the cutter assembly with respect to the base;
    damping means connected between the cutter assembly and the base for regulating the rate of movement of the cutter assembly; and
    limiting means connected between the cutter assembly and the base for controlling the movement limits of the cutter assembly.

5. A lathe for shaping and finishing wooden column shafts comprising;
    a base;
    a bed supported on the base;
    a tailstock assembly mounted on the bed and being movable longitudinally therealong, said tailstock assembly including a first rotatable workpiece-engaging member positioned above the bed;
    a headstock assembly mounted on the base and including a second rotatable workpiece-engaging member positioned above the bed, said second workpiece-engaging member being longitudinally aligned with the first workpiece-engaging member and in opposing relationship thereto to define a workpiece turning axis therebetween above the bed, whereby a workpiece may be positioned between said members and engaged thereby for rotation about the turning axis;
    power means drivingly connected to one of the workpiece-engaging members for rotating the workpiece;
    a rotatable cutter assembly including, a frame pivotally connected to the base below the bed for movement about a pivotal axis, said pivotal axis being substantially parallel with the longitudinal axis of the bed, a portion of the frame extending above the bed, said portion having a cutter journalled for rotation therein, rotary driving means mounted on the frame and operably connected to the cutter for rotating said cutter, positioning means connected between the frame and the base for selectively moving the cutter assembly about the pivotal axis, adjustable damping means connected between the frame and the base for regulating the rate of pivotal movement of the cutter assembly, and adjustable limiting means connected between the frame and the base for controlling the limits of pivotal movement of the cutter assembly, whereby as the cutter assembly is selectively moved about the pivotal axis by the positioning means the cutter periodically engages the workpiece mounted between the workpiece-engaging members;
    a carriage assembly mounted on the bed for movement longitudinally therealong between the headstock and tailstock assemblies, said carriage assembly including two transversely movable cross-feed mechanisms and means for driving the carriage assembly along the bed, each of said cross-feed mechanisms being movable independently of the other and having means for adjusting the transverse position thereof with respect to the turning axis;

a rotary cutter head and means for driving said cutter head mounted on one of the cross-feed mechanisms, whereby said one cross-feed mechanism may be selectively positioned to place the cutter head into engagement with the workpiece mounted between the workpiece-engaging members;

a belt sander and means for driving said sander mounted on the other of the cross-feed mechanisms, whereby said other cross-feed mechanism may be selectively positioned to place the sander into engagement with the workpiece mounted between the workpiece-engaging members; and means mounted on the tailstock assembly for controlling the simultaneous operation of the power means, the rotatable cutter assembly, the cutter head and the sander, whereby the workpiece is shaped and finished to the desired column shaft configuration by the simultaneous operation of the rotatable cutter assembly, the cutter head and the sander upon manipulation of said control means.

6. A lathe as recited in claim 5 further comprising; power operated centering means connected to the base below the bed for positioning a workpiece between the workpiece-engaging members.

7. A lathe as recited in claim 5 further comprising; power operated clamping means operably connected to one of the workpiece-engaging members for securely clamping a workpiece between the workpiece-engaging members.

8. A lathe as recited in claim 5 further comprising; travel control means operably connected to the carriage assembly driving means for controlling the movement of the carriage assembly along the bed, whereby upon movement of the carriage assembly along the bed from the tailstock assembly to the head stock assembly said travel control means reverses the direction of carriage assembly movement causing said carriage assembly to move back along the bed toward the tailstock assembly and come to rest adjacent said tailstock assembly.

References Cited
UNITED STATES PATENTS

| 672,463 | 4/1901 | Toms | 142—40 X |
| 980,967 | 1/1911 | Kinyon | 142—47 |
| 1,001,561 | 8/1911 | Smith | 142—5 X |
| 1,045,370 | 11/1912 | Calahan | 142—47 |
| 3,207,014 | 9/1965 | Carlsted | 82—34 |
| 2,452,885 | 7/1944 | Bukousky | 142—1 X |

DONALD R. SCHRAN, *Primary Examiner.*

R. J. BLATNIK, *Assistant Examiner.*